United States Patent [19]

Tenand et al.

[11] Patent Number: 4,913,601
[45] Date of Patent: Apr. 3, 1990

[54] TOOL-HOLDER SPINDLE FOR A FINE-GRINDING MACHINE, IN PARTICULAR A MACHINE FOR GRINDING THE VALVE SEATS OF HEAT ENGINES

[75] Inventors: Fernand Tenand, Annecy; Daniel Gerard, Annemasse, both of France

[73] Assignee: Societe D'Etude, de Realisation et de Diffusion Industrielles - Serdi, Annecy, France

[21] Appl. No.: 272,443

[22] Filed: Nov. 17, 1988

[30] Foreign Application Priority Data

Nov. 25, 1987 [FR] France ................ 87 16609

[51] Int. Cl.⁴ .................................. B23C 3/05
[52] U.S. Cl. .................... 408/143; 408/81; 408/83.5
[58] Field of Search .................. 408/81–83, 408/83.5, 143

[56] References Cited

U.S. PATENT DOCUMENTS 1,453,643  5/1923  Shearer .
2,418,790  4/1947  Peckham, Jr. ............... 408/81 X
4,365,917  12/1982  Harmand ...................... 409/201

FOREIGN PATENT DOCUMENTS 660707   6/1938  Fed. Rep. of Germany .
2511281  2/1983  France .

Primary Examiner—Steven C. Bishop
Attorney, Agent, or Firm—Oliff & Berridge

[57] ABSTRACT

The present invention concerns a tool holder spindle for a fine-grinding machine, in particular a machine for grinding the valve seats of heat engines.

According to the invention, an antivibration device (50), which is separate from the cutting tool (4), is removably mounted on the free end of the spindle (1). This device comprises a sliding block (10) arranged on the opposite side to the cutting tool (4), relative to the axis of movement of the spindle (1), and this sliding block itself has a face (11) bearing against the surface (6) to be machined, which has already been roughed down but is still to be finished.

5 Claims, 3 Drawing Sheets

TOOL-HOLDER SPINDLE FOR A FINE-GRINDING MACHINE, IN PARTICULAR A MACHINE FOR GRINDING THE VALVE SEATS OF HEAT ENGINES

Generally, the invention converns a tool-holder spindle for a fine-grinding machine. Particularly and therefore not exclusively, the invention concerns a tool-holder spindle for a machine for grinding the valve seats of heat engines, for example petrol combustion engines.

The term "machine" is intended to mean any device, equipment or system, from a hand tool, which is therefore light, to a machine-tool, which is therefore bulky and heavy.

The invention is now introduced, explained and defined with reference to a machine for grinding valve seats, it being understood, nevertheless, that it can apply to any other fine-finishing machine.

The European patent EP-C-0022796, the description of which is incorporated in the present patent application in case required, describes a tool-holder spindle which operates it conjunction with a table having a horizontal movement along two axes and in which the spindle is designed to slide inside a sleeve provided with a spherical guiding core supported on a cushion of air. This spindle has, at its free end or nose, a tool holder to which the cutting tool is fixed, and a coaxial rod intended to be introduced inside the guide of the valve whose seat is to be ground. As a result of the air-cushion support system, the spindle and more precisely the control rod can be inclined and freely and automatically centered with great precision along the actual axis of the valve guide.

With this spindle, it is possible to ensure not only that the axis of the seat is properly aligned with the axis of the guide, but also that the seat has a good surface condition.

Nevertheless, when the finishing pass is performed on the surface to be ground and consequently after the roughing pass has been performed on the latter, a faceted surface is often obtained. This is due to the phenomenon of "jumping" or "chattering" to which cutting tools with a cutting edge are susceptible and with which metal-working specialists and technicians will be familiar.

This phenomenon has often been the subject of a general study. In the present case, it has been found that chattering arises partly from the forces exerted on the spindle or the spindle/tool-holder assembly, as a reaction to the force exerted, during machining, by the part to be ground. These forces vary periodically, like vibrations, and give rise, again periodically, to movement of the spindle relative to its initial position fixed by the control rod inside the valve guide, and/or to flexure of the spindle, the spindle/tool-holder assembly or any other part or functional component of the machine.

The conventional solutions, which counteract the abovementioned flexion and movement of a precision-grinding machine often through the addition of extra weight, do not appear to be suitable, particularly if the machine is to remain practical and manageable.

The present invention relates generally to a tool-holder spindle for a fine-grinding machine, enabling the phenomenon of chattering to be eliminated, without modifying the essential design of the machine and, in particular, without the addition of considerable weight to all or part of the machine.

In particular, the invention concerns a tool-holder spindle for a machine designed to grind valve seats, of the type comprising an actual spindle having at its free end or nose;
- on the one hand, a tool holder to which the actual cutting tool is fixed,
- a control rod coaxial with the axis of translatory or rotational movement of the spindle and intended to be introduced inside the guide of the valve whose seat is to be ground.

The spindle according to the invention is characterized in that an antivibration device, which is separate from the cutting tool, is removably mounted on the free end of the spindle and has a sliding block arranged on the opposite side to the cutting tool relative to the axis of movement of the spindle, the said sliding block having a face which bears against the surfaceto be machined, which has been roughed down but is still to be finished.

An antivibration device according to the invention cooperates with the tool-holder spindle in the following manner.

When the cutting tool reaches the finishing phase, i.e. after the rough-machining phase where the most important part of the machining or grinding has been performed, the antivibration device is mounted and fixed relative to the cutting tool, as defined above, i.e. on the one hand, with the sliding block arranged on the opposite side to the cutting tool and, on the other hand, with the bearing face of the sliding block in contact with the surface to be finished.

During the finishing phase, the antivibration device and more precisely its sliding block create, in the region of the nose of the spindle, a force opposing the force exerted on the tool/tool-holder assembly as a result of machining. This force prestresses the spindle relative to its initial position or camber, i.e. at the start of the finishing phase. And this prestressing force brings the cutting tool into close and permanent contact with the surface to be finished.

Thus, the tension exerted on the sliding block bearing against the surface to be machined, for example the seat to be ground, is greater than the force of the cutting tool. Consequently, this tool no longer refuses to cut and remains constantly in close contact with the surface to be finished. There is no more vibration and hence no more chattering or faceting.

The expression "removable and mounted antivibration device" is intended to refer equally well to a device permanently mounted on the tool-holder spindle, and to a device separated from the spindle, but capable of being mounted on the latter, when the finishing pass is performed.

The manner in which the invention may be achieved and the advantages arising therefrom will emerge more clearly from the example of embodiment which follows, provided by way of a non-limiting example, with the aid of the accompanying drawings in which.

In a manner known per se and with particular reference to the European patent EP-C-0022796, the spindle (1) is capable, on the one hand, of rotating about its axis, in the direction of rotation indicated by the arrow (A) and, on the other hand, of performing a translatory movement, from the top downwards or from the bottom upwards, as indicated by the arrow (B).

Figure 1:
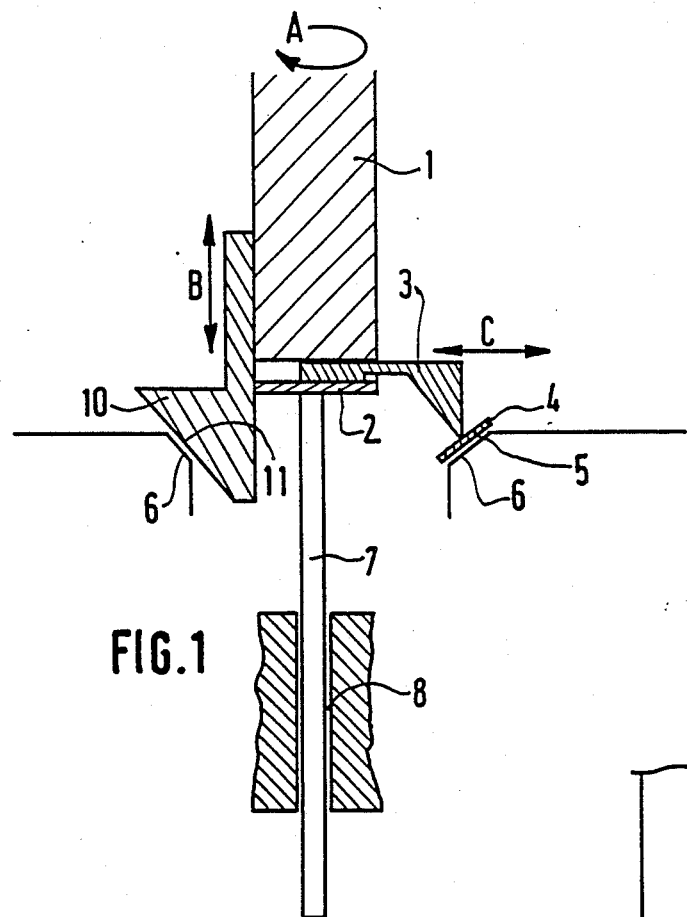
FIG. 1 is a diagrammatic illustration of the tool-holder spindle characterizing the invention.

The free end (2), or nose of the spindle (1), has a tool holder (3) movable relative to the said spindle, for example slidable horizontally as indicated by the arrow (C) in FIG. 1. The actual cutting tool (4) is fixed to the end of this tool-holder, the cutting edge (5) of which tool is intended to machine the seat (6) of the valve to be ground. The free end (2) of the spindle (1) has a coaxial control rod (7) intended to be introduced inside the guide (8) of the valve stem. In a manner not shown, but as already described in the patent EP-C-0022796, the spindle slides inside a sleeve with a spherical core supported on a cushion of air.

Figure 2:
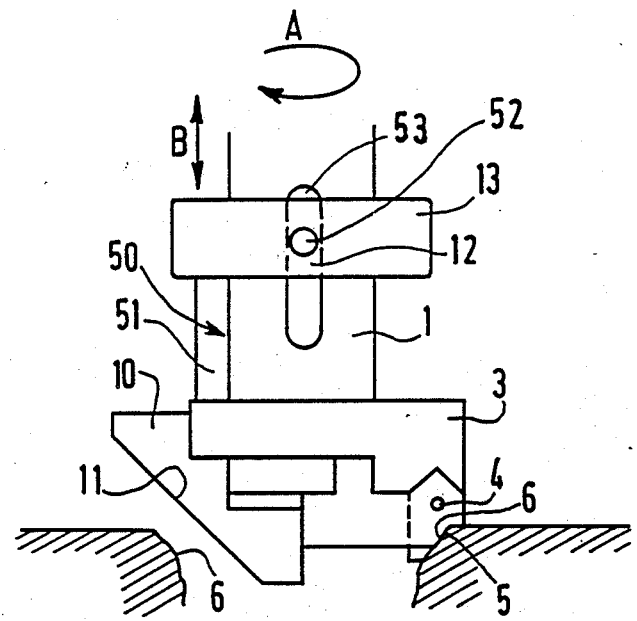
FIG. 2 is a summary view of this spindle, with the antivibration device retracted and the cutting tool in contact with the seat to be ground, during the rough-machining pass of the grinding operation.
Figure 3:
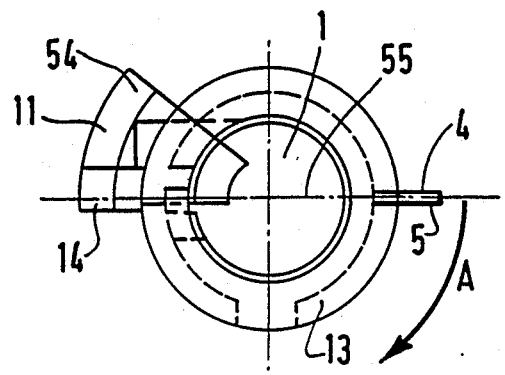
FIG. 3 is a plan view of the antivibration device characterizing the invention.

With reference to FIGS. 2 and 3, the antivibration device (50) is mounted on the nose of the spindle (1), which nose is permanently mountedon the latter, while remaining separate from the cutting tool (4). Nevertheless, it is able to slide on the free end (2) of the spindle (1), in the direction of the arrow (B), while being able to be fixed firmly in position by suitable means described below. Advantageously, but not exclusively, this sliding block is made of bronze, a metal whose abrasion factor is generally greater than that of the seat (6), so as not to destroy the latter, but whose coefficient of friction otherwise allows an excellent sliding action relative to this same seat, so as not to leave any traces during the finishing phase.

This device has, on the one hand, a member (13) in the shape of a ring matching the external section of the free end (2), or nose, of the spindle (1), a sliding block (10) located underneath the element (13) and a cylindrical intermediate wall (51) connecting the member (13) and the sliding block (10); all these parts are generally obtained by means of monobloc diecasting.

The ring (13) has an orifice through which a screw (52) passes and cooperates with an aperture (53) extending along the axis of the spindle, all of which allows the device (50) to be fixed on the spindle (1), in the direction of the arrow (B).

The sliding block (10) constitutes the active part of the antivibration device and has, in a sectional plane passing through the axis of the spindle, an approximately triangular shape, one side of which is arranged in the transverse direction of the surface to be ground. This sliding block is arranged on the opposite side to the cutting tool (4), relative to the axis of movement of the spindle, and it has a face (11) bearing against the surface (6) to be machined, which has been roughed down but is still to be finished as described below. As shown in FIG. 3, i.e. considering a sectional plane perpendicular to the axis of the spindle (1), the sliding block (10) or the bearing face (11) defines the circle sector (54) extending substantially angularly behind the axial plane (55) passing through the cutting edge (5) of the cutting tool (4), relative to the direction (A) of rotation of the spindle (1) during machining. Again if viewed in the direction of rotation (A) during machining, the front edge (14) of the bearing face (11) is offset forwards relative to the abovementioned axial plane (55), i.e. the plane passing through the cutting edge (5) of the cutting tool (4). Preferentially, in the direction (A) of rotation during machining, the front edge is arranged at an angle of between 175° and 180°, preferably of the order of 177°, relative to the axial plane (55). As shown in FIG. 3, the circle sector (54), according to which the bearing face (11) matches the shape of the surface (6) to be machined, forms approximately an angle of betweehn 15° and 30°.

Figure 6:
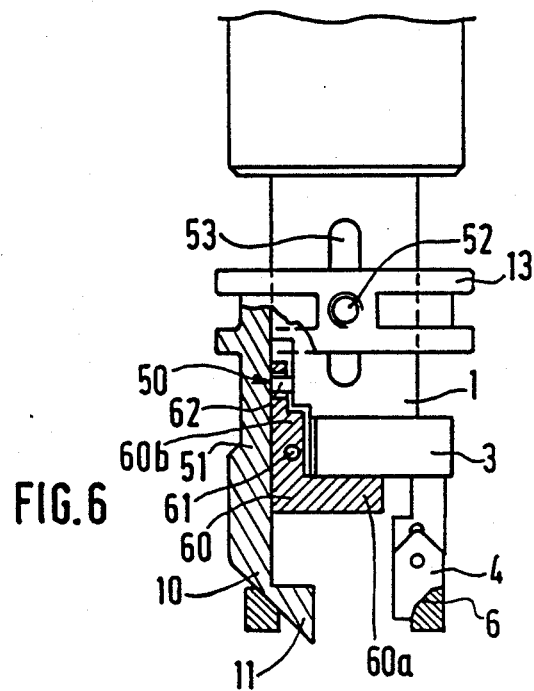
FIG. 6 shows, in diagrammatic form, a special embodiment of an antivibration device according to the invention.

As shown in FIG. 6, the means for positively locking the tool holder (3) are associated with the free end (2) of the spindle (1). These means comprise a clamping shackle (60) hinged about an axis (61) intersecting the free end (2) of the spindle (1); this shackle has two right-angled parts forming levers about the axis (61), a first part (60a), perpendicular to the axis of the spindle, bearing against the bottom side of the tool holder (3), and a second part (60b), extending along the axis of the spindle, having at its end a locking screw (62). This locking screw bears against the spindle (1) and may be adjusted from outside the antivibration device, via a longitudinal slot (not shown) located in the intermediate part (51) of the device and providing access to the head of the screw (62). By tightening the screw (62), it is therefore possible to apply pressure to the spindle (1) and positively lock the tool holder (3) by means of the part (60a) of the shackle.

These positive locking means ensure that the tool holder (3) is stably positioned during the finishing phase, as a result of which the antivibration device (50) dampens solely the vibrations due to the cutting action of the tool (4).

The mode of operation of the antivibration device is now described.

Figure 4:
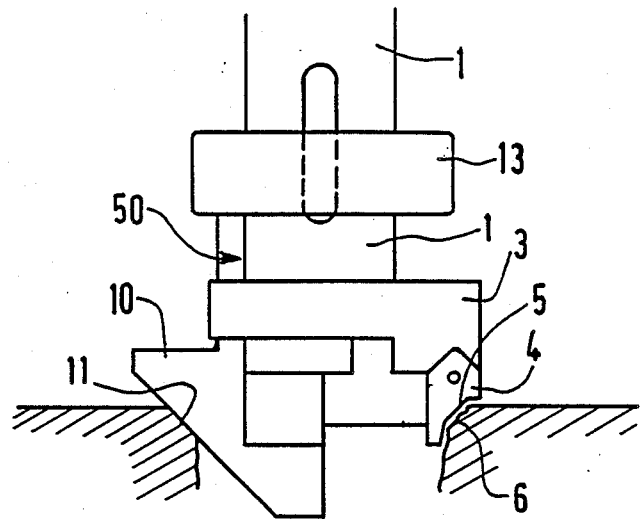
FIG. 4 shows, in cross-section, the position of the antivibration device and that of the cutting tool relative to the part to be ground, at the start of the finishing pass, i.e. before rotation of the spindle.

During grinding, i.e. during the rough-machining pass, as shown in FIG. 2, the antivibration device (50) is retracted, i.e. positioned firmly on the spindle (1) in a position preventing the bearing face (11) from making any contact with the seat (6). When the end of the rough-machining pass is reached, the operator notices a slight chatter and therefore stops rotation of the spindle (1) in the direction of the arrow (A). Two separate operations are then performed. On the one hand, the spindle (1) is raised so that there is a gap between the surface (6) and the cutting edge (5) of the tool (see FIG. 4) and, on the other hand, the antivibration device (50) is positioned and fixed downward until the bearing face (11) of the sliding block (10) makes close contact with the seat (6).

Figure 5:
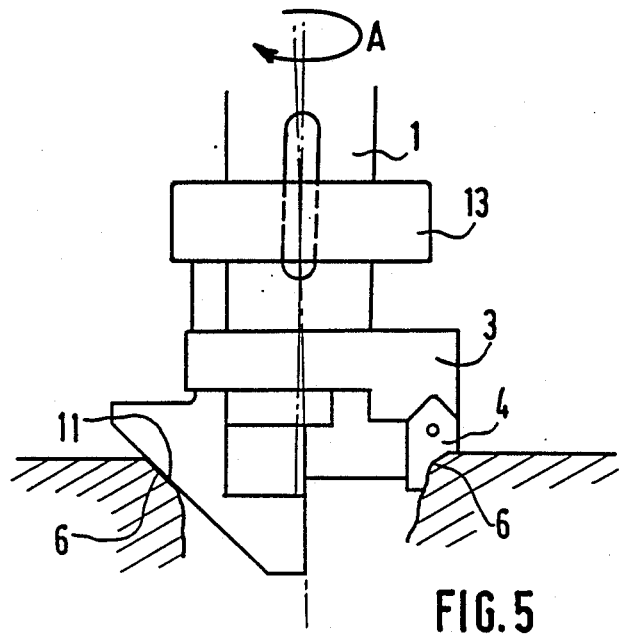
FIG. 5 shows, in cross-section, the position of the antivibration device and that of the cutting tool during the finishing pass.

The finishing pass is then able to commence, by making the spindle (1) rotate slowly, still in the direction (A), as shown in FIG. 5. At this point, the spindle (1) is prestressed as a result of the force arising from contact between the bearing face (11) and the seat (6), and the cutting tool (4) comes into contact with the ground seat (6), thereby preventing any possibility of vibration, chattering and, consequently, faceting. The finishing phase can therefore be performed under very favorable conditions, allowing a few hundredths of metal to be removed without chattering.

We claim:

1. A tool-holder spindle for a fine-grinding machine, in particular a machine for grinding the valve seats of heat engines, comprising:
   an actual spindle having a free end,
   a cutting tool fixed to the free end of said spindle, and having a cutting edge disposed to one side of said spindle,
   an antivibration device, separate from the cutting tool, removably mounted on said free end, comprising a sliding block arranged on an opposite side of the cutting tool relative to the axis of movement of the spindle, said sliding block having a front edge and a face for bearing against a surface to be machined, the sectional extension of said face defining a circle sector extending essentially angularly behind an axial plane passing through said cutting edge, in the direction of rotation of the spindle.

2. A spindle as claimed in claim 1, wherein in the direction of rotation of the spindle during machining, said front edge of the sliding block is offset forward relative to the axial plane passing through the cutting edge of the cutting tool.

3. A spindle as claimed in claim 2, wherein, in the direction of rotation of the spindle during machining, the front edge is arranged at an angle of between 175° and 180° relative to the axial plane passing through the cutting edge of the cutting tool.

4. A spindle as claimed in claim 1, wherein the circle sector, according to which the bearing face matches the shape of the surface to be machined, forms an angle of between 15° and 30°.

5. A spindle as claimed in claim 1, further comprising a tool holder to which the cutting tool is fixed, wherein a clamping shackle is hinged about an axis intersecting the free end of the spindle, and means for positively locking the shackle, which cooperate with the free end of the spindle.

* * * * *